United States Patent Office 3,441,634
Patented Apr. 29, 1969

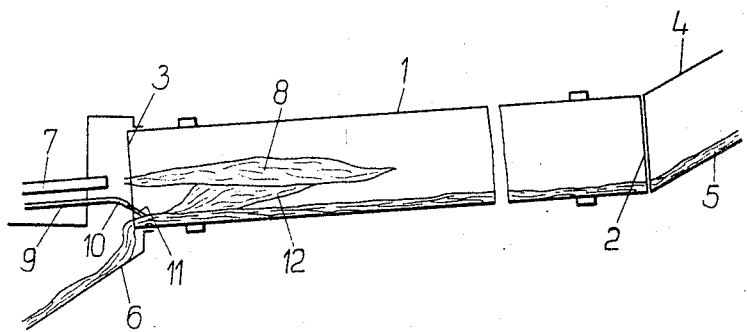

3,441,634
PROCESS FOR PRODUCING CEMENT
AND SIMILAR MATERIALS
Horst Iken, Dusseldorf, and Manfred Schrage, Osterath,
Germany, assignors to Messer Griesheim G.m.b.H.,
Frankfurt am Main, Germany, a corporation of
Germany
Filed June 2, 1967, Ser. No. 643,161
Int. Cl. F27d 9/00; C04b 7/44
U.S. Cl. 263—53                            5 Claims

ABSTRACT OF THE DISCLOSURE

Process for producing cement and similar materials by burning a combustible mixture in a kiln and introducing a stream of oxygen into the kiln directly onto the heated material therein and then deflecting the heated oxygen stream into the burning mixture.

BACKGROUND OF THE INVENTION

The present invention relates to a process for producing cement and similar materials, and more particularly to a process wherein a burning mixture is supplied with a preheated stream of oxygen.

Prior to the present invention numerous arrangements have been proposed for increasing the temperature of the flame in a rotary kiln. For example, as disclosed in German Patent 1,153,312, a stream of oxygen is directed into the kiln parallel to the flame to increase the temperature of the flame. The oxygen emerges at a relatively high speed and when it touches the flame the temperature within the kiln is increased. However, such a process has the disadvantage of introducing the oxygen into the kiln at room temperature. Although the speed of combustion of the fuel-air mixture producing the flame is increased considerably by the stream of oxygen, this increase does not achieve the maximum degree possible since the oxygen must first be heated to the combustion temperature of the burning flame.

Accordingly, it is an object of the present invention to provide a novel process wherein preheated oxygen is utilized to increase the temperature of a burning mixture in the production of cement and similar materials.

SUMMARY OF THE INVENTION

In accordance with the present invention, a method is provided for producing cement and similar materials in a kiln. The process comprises the steps of burning an combustible mixture in the kiln and introducing a stream of oxygen into the burning mixture by first directing the oxygen stream onto the heated material within the kiln and then deflecting the heated oxygen into the burning mixture.

The stream of oxygen may be introduced into the kiln at the discharged end thereof whereby the oxygen is directed onto the heated material leaving the kiln to thereby cool that material. Moreover, the stream of oxygen can be directed onto the heated material within the kiln at various angles thereto so the oxygen stream is deflected from the surface of that material into the burning mixture. By directing the oxygen onto the heated material within the kiln the oxygen is heated to a temperature of about between 100 and 1,000° C. prior to being deflected into the burning mixture.

BRIEF DESCRIPTION OF THE DRAWING

Novel features and advantages of the present invention in addition to those mentioned above will become apparent to one skilled in the art from a reading of the following detailed description in conjunction with the accompanying drawing wherein similar reference characters refer to similar parts and in which:

The figure is a view of one embodiment according to the present invention.

DETAILED DESCRIPTION OF THE INVENTION

Referring more particularly to the drawing, reference numeral 1 represents the cylinder of a rotary kiln having a feed end 2 and a discharge end 3. A falling channel 4 is arranged at the feed end 2 of the cylinder for directing the material to be processed into the cylinder. As clearly illustrated in the drawing, the material travels along the cylinder and leaves by way of a grating 6 at the discharge end 3.

A torch 7 is provided at the discharge end of the kiln for supplying the discharge end of the kiln with a combustible mixture. A carbon-air flame 8 is produced when the combustible mixture is ignited. Immediately below the torch a tube 9 is provided having a bent end section 10 directed toward the material within the kiln. The tube is connected at one end to a source of oxygen and the oxygen from that source is directed through the bent end section 10 of the tube directly onto the heated material within the kiln. When the oxygen strikes the heated material heat is given up by the material to the oxygen whereby the material is cooled and the oxygen is heated. Upon impact, the oxygen is finally divided and deflected into the combustible mixture as an oxygen stream or oxygen vapor 12.

By directing the stream of oxygen in the manner described above the flame temperature is significantly increased as well as the speed of combustion of the combustible mixture. Considerable heating of the oxygen is achieved and the temperature of that stream can be increased from room temperature to a temperature of about 100 to 1,000° C.

Additionally, according to the present invention, the amount of fuel necessary to produce a flame of a given temperature can be minimized. Regardless of whether the heated oxygen is utilized to increase the temperature of the flame or to maintain a given flame temperature with a minimum amount of fuel, the heating of the oxygen takes place without any additional energy input since the heated material within the kiln is utilized effectively to preheat the oxygen stream.

As previously mentioned, the invention has the further advantage in that by directing the oxygen stream onto the material within the kiln the temperature of that material is decreased Since the temperature of this material is generally higher than allowable for subsequent grating and the like, in the past, it was necessary to cool the material after discharge from the kiln by means of air streams, for example. According to the present invention, this cooling step can be completely eliminated or considerably reduced since heat from the material leaving the kiln is taken up by the stream of oxygen directed onto that material.

The present invention has the further advantage in that the length of the flame, contrary to the known state of the art, is not increased by the introduction of oxygen. For example, in German Patent 1,153,312 the oxygen stream is introduced into the flame whereby the oxygen slowly enters the flame and lengthens it. In the present invention, by deflecting the oxygen stream into the combustible mixture, the oxygen enters the mixture transversely from below and thereby comes in contact with the burning mixture by a considerably shorter stretch when compared to the prior art arrangements. By shortening the flame in this manner the brick lining at the feed end of the kiln as well as other structural components of the kiln can be designed for lower temperature operation.

Moreover, in accordance with the present invention the impact angle of the oxygen stream onto the material layer within the kiln can be adjustable. Thus, by adjusting this angle the size of the impact surface of the oxygen stream on the burning flame can be changed to thereby adjust the length of the flame produced by the combustible mixture.

When the inventive process is used with respect to dolomite stone, an amount of fuel substantially equal to an amount of fuel used in a prior art arrangement produces a higher flame temperature and the sintered dolomite thus produced has a particularly low porosity.

What is claimed is:

1. A process for porducing cement and similar materials in a kiln comprising the steps of burning a combustible mixture in the kiln and introducing below the burning mixture a stream of oxygen into the mixture by first directing the stream of oxygen onto the heated material within the kiln to thereby heat the oxygen and simultaneously cool the material, and then deflecting the heated oxygen into the burning mixtuse to incsease its temperature.

2. A process as in claim 1 wherein the stream of oxygen introduced into the burning mixture is directed onto the heated material at the discharge end of the kiln whereby the material at that end is cooled before it is discharged.

3. A process as in claim 1 wherein the stream of oxygen is directed onto the heated material within the kiln at an angle to that material.

4. A process as in claim 3 wherein the angle at which the stream of oxygen is directed onto the heated material within the kiln is adjustable whereby the impact surface of the heated oxygen stream on the flame produced by the combustible mixture varies to adjust the length of the flame.

5. A process as in claim 1 wherein the stream of oxygen is heated to a temperature of about between 100 to 1,000° C. by directing the oxygen stream onto the heated material within the kiln.

References Cited

UNITED STATES PATENTS

| | | | |
|---|---|---|---|
| 797,506 | 8/1905 | Eldred | 263—33 |
| 2,187,922 | 1/1940 | West et al. | 263—33 |
| 2,584,808 | 2/1952 | Newhouse | 263—33 |
| 3,074,707 | 1/1963 | Humphries et al. | 263—53 |

JOHN J. CAMBY, *Primary Examiner.*